C. E. THOMSEN.
STEERING WHEEL LOCK.
APPLICATION FILED MAY 29, 1916.
1,248,204.
Patented Nov. 27, 1917.
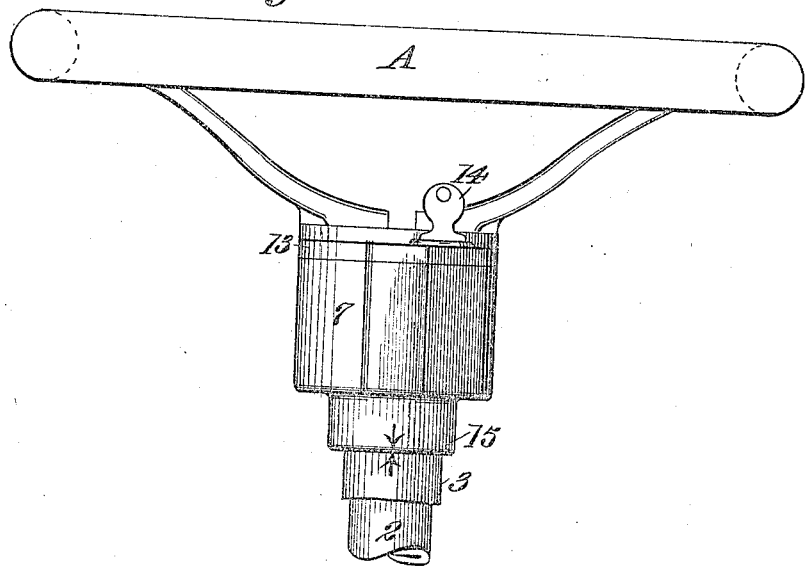
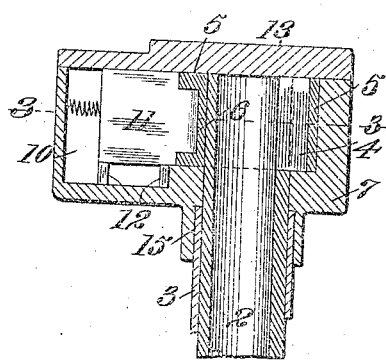
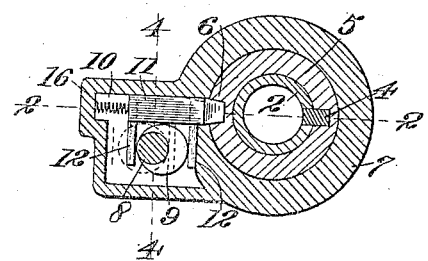
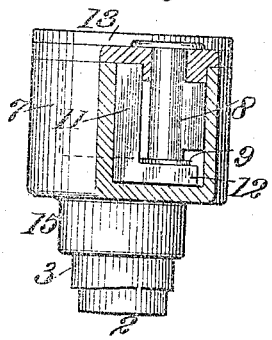
WITNESSES:
Charles Pickles
Thos Castberg
INVENTOR
Carl E. Thomsen
BY
ATTORNEYS

UNITED STATES PATENT OFFICE.

CARL E. THOMSEN, OF BERKELEY, CALIFORNIA.

STEERING-WHEEL LOCK.

1,248,204.   Specification of Letters Patent.   Patented Nov. 27, 1917.

Application filed May 29, 1916. Serial No. 100,538.

*To all whom it may concern:*

Be it known that I, CARL E. THOMSEN, a citizen of the United States, residing at Berkeley, in the county of Alameda and State of California, have invented new and useful Improvements in Steering-Wheel Locks, of which the following is a specification.

This invention relates to a steering wheel lock.

It is one of the objects of the present invention to provide a simple, substantial locking mechanism, whereby it becomes possible to lock or unlock the steering wheel with relation to the steering post of an automobile or other vehicle, thus making it possible to render the steering wheel inoperative and, furthermore, prevent unauthorized persons from appropriating or using same. Further objects will hereinafter appear.

The invention consists of the parts and the construction and combination of parts as hereinafter more fully described and claimed, having reference to the accompanying drawings, in which—

Figure 1 is a side elevation of the upper end of a steering wheel post, showing the application of the invention.

Fig. 2 is a central, vertical section on line 2—2 of Fig. 3.

Fig. 3 is a plan section on line 3—3 of Fig. 2.

Fig. 4 is a vertical section on line 4—4 of Fig. 3.

Referring to the drawings in detail, A indicates an ordinary steering wheel; 2 the post; and 3 the stationary housing or sleeve surrounding the post. Secured on the upper end of the post 2, in any suitable manner, or as here shown by means of a key 4, is a collar 5, on one side of which is formed a vertically positioned groove 6. Turnably mounted about the post 2 and the sleeve 3 is a casing 7 in which is mounted a pin-cylinder lock, generally indicated at 8.

Secured on the lower end of the cylinder in the lock is an eccentric 9, and slidably mounted in a guideway 10, formed in the casing, is a lock bolt 11, on one side of which is formed a pair of forwardly projecting arms 12. These arms are mounted in alinement with the eccentric 9 and the spacing between same is just sufficient to straddle the eccentric. Forming a closure for the casing 7, which contains the pin-cylinder lock 8 and the coöperating bolt 11, is a cover section 13. This is secured to the casing in any suitable manner, and as it is secured thereto it can readily be seen that it will turn freely about the post with the casing 7 once it is locked with relation to the steering post, as will hereinafter be described.

The steering wheel A is shown as secured to the cover. It may, however, be secured to the casing, if desired, as the object sought is to provide a wheel which will turn with the casing when this is free, or turn the post and casing when locked.

In operation, if it is desired to lock the wheel with relation to the post 2, it is only necessary to insert a key 14 through the cover to operate the pin-cylinder lock 8. Turning movement of the cylinder, upon which the eccentric 9 is mounted, by means of the key 14, in one direction will move the bolt 11 into locking engagement with the groove 6 formed on the collar 5; this being caused by the engagement of the eccentric with the projecting arms 12. This movement of the bolt forms a lock between the casing, the collar and the post, in this manner permitting the wheel A to be operated in the usual manner.

If it is desired to release the wheel A when leaving the automobile, it is only necessary to insert the key 14 and turn it in the opposite direction. This will turn the eccentric 9 in the reverse direction, and as this engages with the arms 12 it can easily be seen that the bolt 11 will be retracted with relation to the groove 6 in the collar 5, thus releasing the casing or unlocking same with relation to the collar and post. The key 14 is then removed and retained by the operator, and it can, therefore, be seen that the wheel is rendered inoperative as it will now turn freely with the casing 7 about the post. It is thus impossible for any unauthorized person to appropriate or use the car, as the steering mechanism as a whole is inoperative.

Formed on the lower side of the casing 7 is a downwardly projecting hub section 15. This incloses the stationary sleeve 3 and in this manner prevents access to the interior of the casing. It, furthermore, forms a seat or bearing for the casing and wheel and as a whole provides a more rigid and easily alined structure.

While a standard form of pin-cylinder lock is shown, I wish it understood that any other form of locking mechanism may be applied as this may, obviously, be changed to suit various conditions and demands.

A spring 16 is preferably interposed between the bolt 11 and the casing. This is merely provided for the purpose of preventing rattling of the parts.

The materials and finish of the several parts of the device are such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. The combination with the steering post of a vehicle, a casing freely turnable on the post, means within the casing for releasably locking the latter to the post, a solid cover plate for the casing seating directly on the upper end of the steering post, and a steering wheel having its spokes radiating from and fixed to the upper face of the cover plate.

2. In combination, a steering post, a casing freely turnable thereabout, means for locking the casing to the post including an L-shaped locking member, the vertical part of the L-member constituting the bolt and the horizontal part comprising spaced arms, means disposed between the spaced arms for engaging therewith to operate the bolt, and a cover means for the casing seating directly on the upper end of the post and carrying steering means for turning the post.

In testimony whereof I have hereunto set my hand in the presence of two subscribing witnesses.

CARL E. THOMSEN.

Witnesses:
JOHN H. HERRING,
W. W. HEALEY.